US009444992B2

(12) United States Patent
Umezawa et al.

(10) Patent No.: US 9,444,992 B2
(45) Date of Patent: Sep. 13, 2016

(54) FOCUS CONTROL APPARATUS AND METHOD

(71) Applicant: HITACHI INDUSTRY & CONTROL SOLUTIONS, LTD., Ibaraki (JP)

(72) Inventors: Iori Umezawa, Tokyo (JP); Tomoaki Nishiguchi, Tokyo (JP)

(73) Assignee: Hitachi Industry & Control Solutions, Ltd., Ibaraki (JP)

( * ) Notice: Subject to any disclaimer, the term of this patent is extended or adjusted under 35 U.S.C. 154(b) by 0 days.

(21) Appl. No.: 14/548,404

(22) Filed: Nov. 20, 2014

(65) Prior Publication Data

US 2015/0189155 A1 Jul. 2, 2015

(30) Foreign Application Priority Data

Dec. 27, 2013 (JP) ................................. 2013-270799

(51) Int. Cl.
*H04N 5/232* (2006.01)
(52) U.S. Cl.
CPC ................................ *H04N 5/23212* (2013.01)
(58) Field of Classification Search
CPC .................................................. H04N 5/23212
USPC ....................................................... 348/345
See application file for complete search history.

(56) References Cited

U.S. PATENT DOCUMENTS

| 6,094,223 A * | 7/2000 | Kobayashi | ............... | G02B 7/28 348/345 |
| 7,729,604 B2 * | 6/2010 | Wen | ......................... | G02B 7/36 250/201.7 |
| 8,786,762 B2 * | 7/2014 | Ito | .......................... | G02B 7/36 348/345 |
| 2006/0227238 A1 * | 10/2006 | Kuroki | ............... | H04N 5/23212 348/353 |
| 2008/0159728 A1 * | 7/2008 | Wu | .......................... | G03B 7/28 396/121 |

FOREIGN PATENT DOCUMENTS

JP 2007-065048 A 3/2007

* cited by examiner

*Primary Examiner* — Roberto Velez
*Assistant Examiner* — Cynthia Segura
(74) *Attorney, Agent, or Firm* — Mattingly & Malur, PC

(57) ABSTRACT

A focus control apparatus that achieves a focused state even when a subject is a point light source includes a contrast signal generator that divides a captured image screen into a plurality of areas, extracts a frequency component based on a video signal for each of the divided areas, and generates a first contrast signal based on the frequency component. A controller extracts a luminance intensity based on the video signal for each of the divided areas, determines, for each of the divided areas, a second contrast signal generated by increasing or decreasing the magnitude of the first contrast signal from the divided area based on the magnitude of the luminance intensity, determines a lens position evaluation value that is the sum of the second contrast signals, and performs the focus control based on the lens position evaluation value.

9 Claims, 5 Drawing Sheets

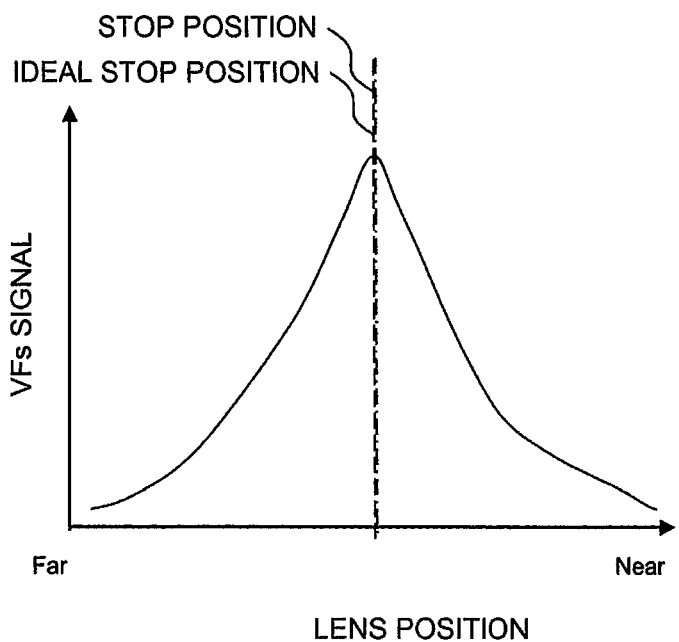

FOCUS CONTROL APPARATUS AND METHOD

BACKGROUND OF THE INVENTION

1. Technical Field

The present invention relates to a focus control apparatus and method.

2. Related Art

Many imaging apparatus of related art, such as a monitoring camera and a DVD (digital versatile disc) camera, have a built-in autofocus function that allows automatic focus adjustment. An example of a focusing method in an automatic focus function of this type is a contrast-based focus adjustment method using a fact that the amplitude of a contrast signal provided from captured video images is maximized when the images are brought into focus.

In an imaging apparatus, when a focusing lens is moved along the optical axis thereof, captured video images are defocused or brought into focus and the amplitude of the contrast signal changes accordingly. In a most fundamental contrast-based method, the focusing lens is temporarily moved along the optical axis thereof, and a direction in which images are brought into focus is detected based on the magnitude of the amplitude of the contrast signal before and after the movement, followed by movement of the focusing lens in the detected direction.

In focusing methods used in the autofocus function, it is difficult to bring an image of a point light source in a dim environment into focus in many cases. The reason for this is that an image of a point light source that is not brought into focus spreads as compared with an image of the point light source that is brought into focus and the lens position where the amplitude of the contrast signal is maximized is shifted from the position where the image is brought into focus in some cases. To solve the problem described above, JP-A-2007-065048 describes a technology for dividing a captured image into a plurality of areas, evaluating the luminance level in each of the areas, and selecting an exposure condition under which autofocus control is performed in accordance with the evaluated luminance level.

However, when only the exposure condition is changed, an image of a point light source may still spread or otherwise deforms depending on the lens position. It is therefore difficult to bring the image into focus in many cases.

The invention has been made in consideration of the point described above and proposes a focus control apparatus and method capable of achieving a focused state even when a subject is a point light source or an object under a similar condition.

SUMMARY OF THE INVENTION

To achieve the proposal described above, an imaging apparatus that performs focus control includes a contrast signal generator that divides a captured image screen into a plurality of areas, extracts a frequency component based on a video signal for each of the divided areas, and generates a first contrast signal based on the frequency component and a controller that extracts a luminance intensity based on the video signal for each of the divided areas, determines, for each of the divided areas, a second contrast signal generated by increasing or decreasing the magnitude of the first contrast signal from the divided area based on the magnitude of the luminance intensity, determines a lens position evaluation value that is the sum of the second contrast signals, and performs the focus control based on the lens position evaluation value.

According to the invention, even when a subject is, for example, a point light source, focusing precision under the focus control can be improved.

BRIEF DESCRIPTION OF THE DRAWINGS

FIG. 7 shows an example of the lens position evaluation value in the present example.

FIG. 8 shows a table illustrating the relationship between luminance intensities and bias values.

DESCRIPTION OF EMBODIMENTS

An embodiment of the invention will be described below in detail with reference to the drawings.

(1) Configuration of Imaging Apparatus 1

Figure 1:
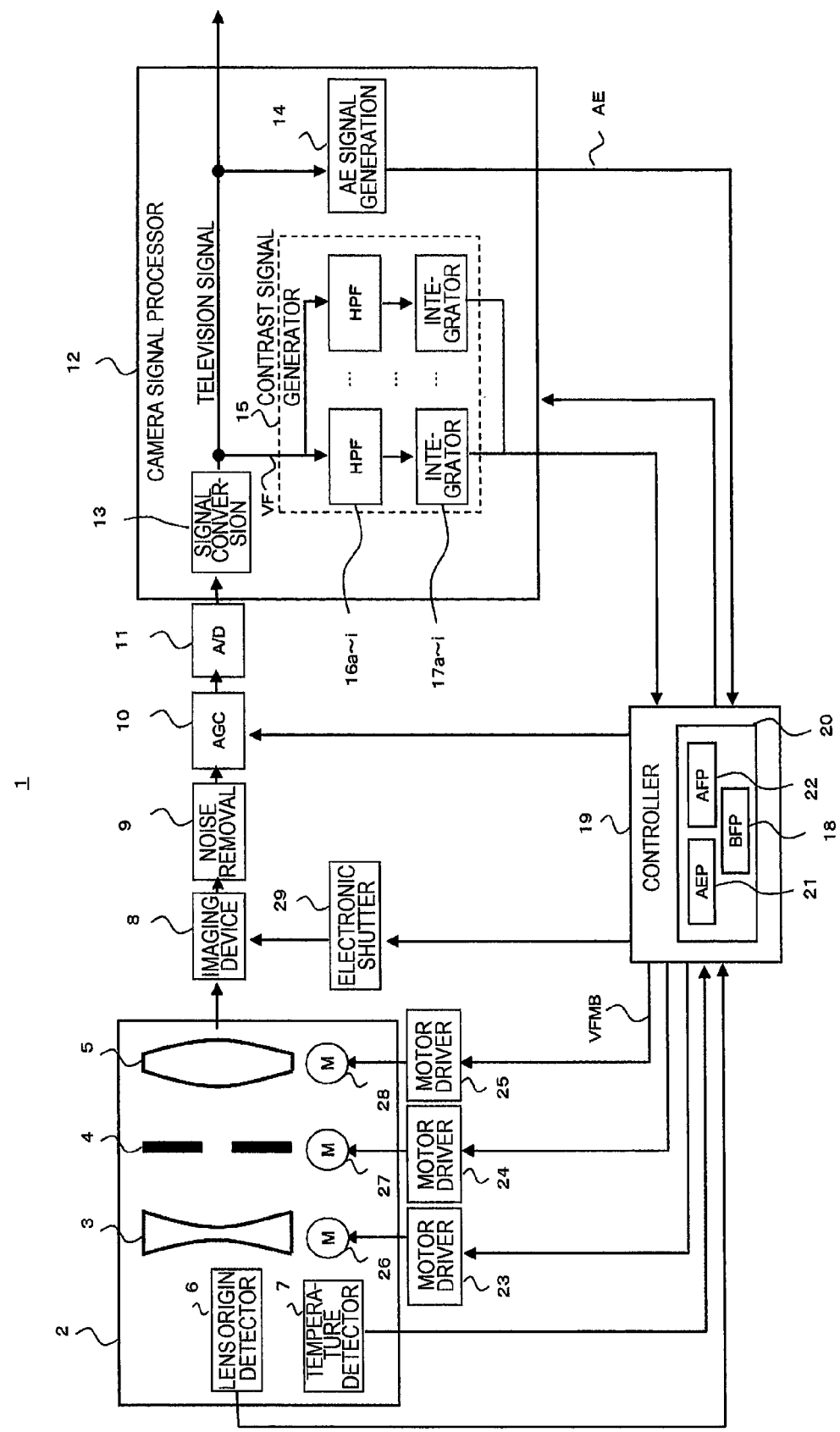
FIG. 1 is a block diagram showing an overall configuration of an imaging apparatus according to an embodiment of the invention.

FIG. 1 is a block diagram showing an overall configuration of an imaging apparatus 1 according to the present embodiment.

In the imaging apparatus 1, a lens unit 2 includes a variator lens group 3, which magnifies a light flux from a subject, an aperture 4, which adjusts the amount of received light, and a focusing lens group 5, which has a focus adjustment function.

The lens unit 2 is further provided with a lens origin detector 6, which is formed, for example, of a photo-interrupter, and a temperature detector 7. The lens origin detector 6 detects absolute positions of the variator lens group 3 and the focusing lens group 5 and transmits results of the detection as lens absolute position information to a controller 19. The temperature detector 7 detects the temperature in the lens unit 2 and transmits a result of the detection as in-lens-unit temperature information to the controller 19 incorporated in the imaging apparatus 1 or a system capable of communicating with the imaging apparatus 1. The lens unit 2 still further includes motors 26 to 28, which drive the variator lens group 3, the aperture 4, and the focusing lens group 5, respectively. The motors 26 to 28 can be driven based on motor control signals from motor drivers 23 to 25, respectively.

An imaging device 8 forms an optical image of a subject on a light receiving surface of the imaging device 8, which is formed, for example, of a CCD. The optical image of the subject formed on the light receiving surface is photoelectrically converted, and the resultant captured image signal is sent to a noise removal circuit 9. The noise removal circuit 9 performs predetermined noise removal on the captured image signal, and the processed signal is inputted to an automatic gain control circuit (AGC: automatic gain controller) 10. The AGC amplifies the captured image signal into a video signal having an optimum level, which is then outputted to an analog/digital conversion circuit (A/D) 11, where the video signal is converted into a digital signal, which is then outputted as a digital captured image signal to a camera signal processor 12.

The camera signal processor 12 includes a signal conversion circuit 13, an AE (automatic exposure) signal generation circuit 14, and a contrast signal generator 15.

The signal conversion circuit 13 performs predetermined signal processing on the digital captured image signal outputted from the analog/digital conversion circuit (A/D) 11. The signal conversion circuit 13 converts the digital captured image signal into a standard television signal that conforms to the NTSC (National Television Standards Committee) standard, the PAL (Phase Alternating Line) standard, or any other predetermined television scheme and outputs the converted signal to an external apparatus.

Based on the television signal, the AE (automatic exposure) signal generation circuit 14 generates an automatic iris signal AE having a signal level according, for example, to the brightness of current captured video images, the degree of opening of the aperture 4 in the lens unit 2, and the gain of the automatic gain control and outputs the automatic iris signal AE to the controller 19.

The contrast signal generator 15 includes highpass filter circuits 16a to 16i and integrators 17a to 17i. Each of the highpass filter circuits 16a to 16i is configured to be capable of arbitrarily changing a cutoff frequency. The contrast signal generator 15, which is formed of the highpass filter circuits 16a to 16i and the integrators 17a to 17i, is configured to be capable of acquiring values within the value range of an arbitrary television signal. The contrast signal generator 15 can extract high-frequency components in luminance signals, for example, from detection areas A to I shown in FIG. 2 through the highpass filter circuits (HPFs) 16a to 16i, respectively.

Figure 2:
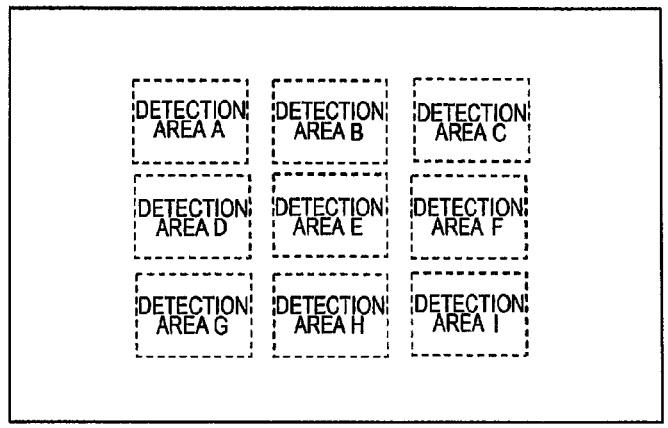
FIG. 2 describes the shape and position of detection frames in the present embodiment.

FIG. 2 describes the shape and position of a detection frame in the present embodiment. FIG. 2 shows an example in which nine detection areas having the same size are specified. It is, however, noted that the shape, position, and size of the detection areas may be arbitrarily determined.

Referring back to FIG. 1, the contrast signal generator 15 performs integration in the integrators 17a to 17i based on the extracted high-frequency components to generate first contrast signals VFa to VFi. The camera signal processor 12 then sums the first contrast signals VFa to VFi to generate a contrast signal VFs. The thus generated contrast signal VFs is sent to the controller 19.

The controller 19 includes a CPU (central processing unit), an internal memory 20, and other components (neither of them is shown). The internal memory 20 stores a back focal distance adjustment program 18, an automatic iris data processor (AEP) 21, and an autofocus data processor (AFP) 22. The controller 19 determines the brightness of current captured video images based on the automatic iris signal AE and calculates an automatic iris evaluation value, which is an evaluation value associated with the degree of opening of the aperture 4, the gain of the automatic gain control, and other factors. The controller 19 further generates first and second motor control signals based on the automatic iris evaluation value, zoom magnification information representing the current zoom magnification obtained based on the lens absolute position information from the lens origin detector 6, the in-lens-unit temperature information provided from the temperature detector 7, and trace curve data stored in the internal memory 20 and sends the first and second motor control signals to the motor driver circuits 23 and 24. The motor driver circuit 23 thus drives and controls the motor 26, which moves the variator lens group 3 in the lens unit 2 in the direction along the optical axis thereof, based on the first motor control signal. Further, the motor driver circuit 24 drives and controls the second motor 27, which drives the aperture in the lens unit 2, based on the second motor control signal. Automatic iris control is thus performed. The controller 19 further detects an in-focus direction and position based on an autofocus evaluation value, generates a third motor control signal based on a result of the detection, and sends the third motor control signal to the third motor driver circuit 25. The third motor driver circuit 25 thus drives and controls the third motor 28, which moves the focusing lens group 5 in the lens unit 2 in the direction of the optical axis thereof, based on the third motor control signal. Autofocus control is thus performed.

(2) Autofocus Control Method in Example of Present Invention

Figure 3:
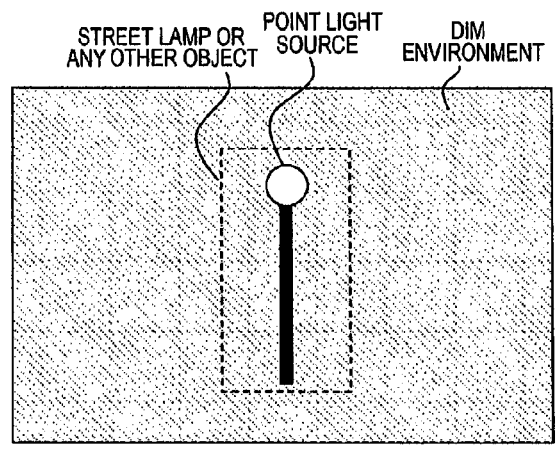
FIG. 3 shows a case where a point light source, such as a street lamp, is present in a dim environment as a subject in a captured image screen.

In the thus configured imaging apparatus, a description will be made of the first contrast signal VFs in a case where an image of a subject shown in FIG. 3 is captured and the focusing lens group 5 is shifted from an in-focus position.

Figure 4:
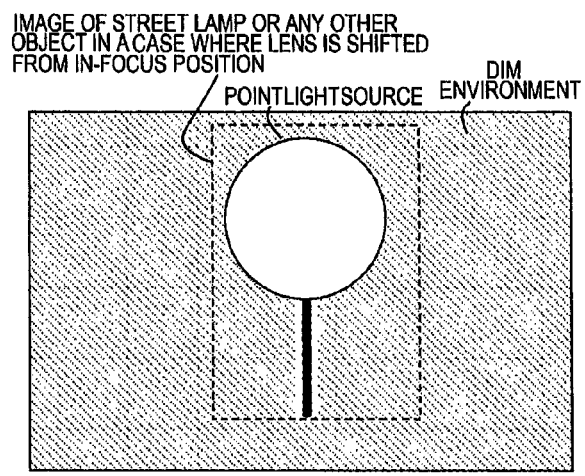
FIG. 4 is a diagrammatic view of the captured image screen in a state in which an image of the point light source subject is not brought into focus.

FIG. 3 shows a case where a point light source, such as a street lamp, is present in a dim environment as a subject in a captured image screen. When an image of the subject is captured with the focusing lens group 5 shifted from the in-focus position, the image of the point light source spreads as compared with an image of the point light source that is brought into focus, resulting in a captured image screen shown in FIG. 4. FIG. 4 is a diagrammatic view of a captured image screen in a state in which an image of the point light source subject is not brought into focus.

Figure 5:
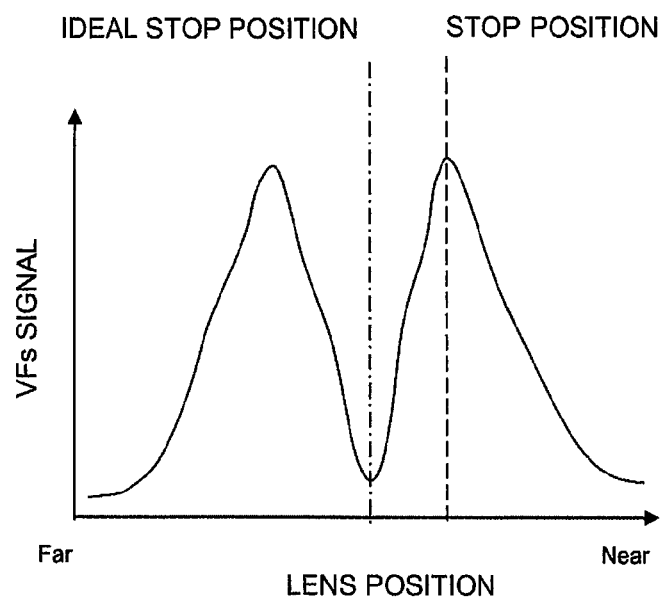
FIG. 5 shows a characteristic curve of a contrast signal in a case where a point light source subject is present and a focusing lens group is shifted from an in-focus position.

FIG. 5 shows a characteristic curve of the contrast signal VFs resulting from the point light source subject in a case where the focusing lens group 5 is shifted from an in-focus position, for example, as in FIG. 4.

As shown in FIG. 5, the contrast signal VFs peaks at positions different from an ideal stop position. The reason for this is that the focusing lens group 5 shifted from the in-focus position produces a larger bright area as shown in FIG. 4. Therefore, when the controller 19 detects a peak of the contrast signal VFs and then stops the movement of the focusing lens group 5 in the lens unit 2, the focusing lens group 5 stops in a position different from the ideal stop position, resulting in inappropriate in-focus precision.

In view of the fact described above, in the present example, to perform the focus control based on the first contrast signals VFa to VFi provided from the highpass filter circuits 16a to 16i and the integrators 17a to 17i, a configuration in which the effect of the first contrast signal from an area containing a point light source less is lowered is employed. That is, for example, in the detection areas A to I shown in FIG. 2, the first contrast signal from an area brighter than the other areas may be configured to less affect the focus control than the other first contrast signals.

To this end, having initiated the focus control, the controller 19 extracts the intensities of the luminance signals from the detection areas A to I as luminance intensities Ba to Bi. The controller 19 then determines a luminance intensity Bs, which is the sum of the luminance intensities Ba to Bi, and determines quotients (Bs/Ba to Bs/Bi) of the luminance intensity Bs divided by the luminance intensities Ba to Bi for the detection areas A to I. In this process, when no high luminance portion is present in the screen, the luminance intensities Ba to Bi are lower than the luminance intensity Bs, and the quotients or the results of the division (Bs/Ba to Bs/Bi) are relatively large values accordingly. On the other hand, when a high luminance portion is present in the screen, part of the luminance intensities Ba to Bi in the detection areas where the high-luminance subject is present is higher than the luminance intensity Bs, and the corresponding quotients or results of the division (Bs/Ba to Bs/Bi) are relatively small values accordingly.

Figure 6:
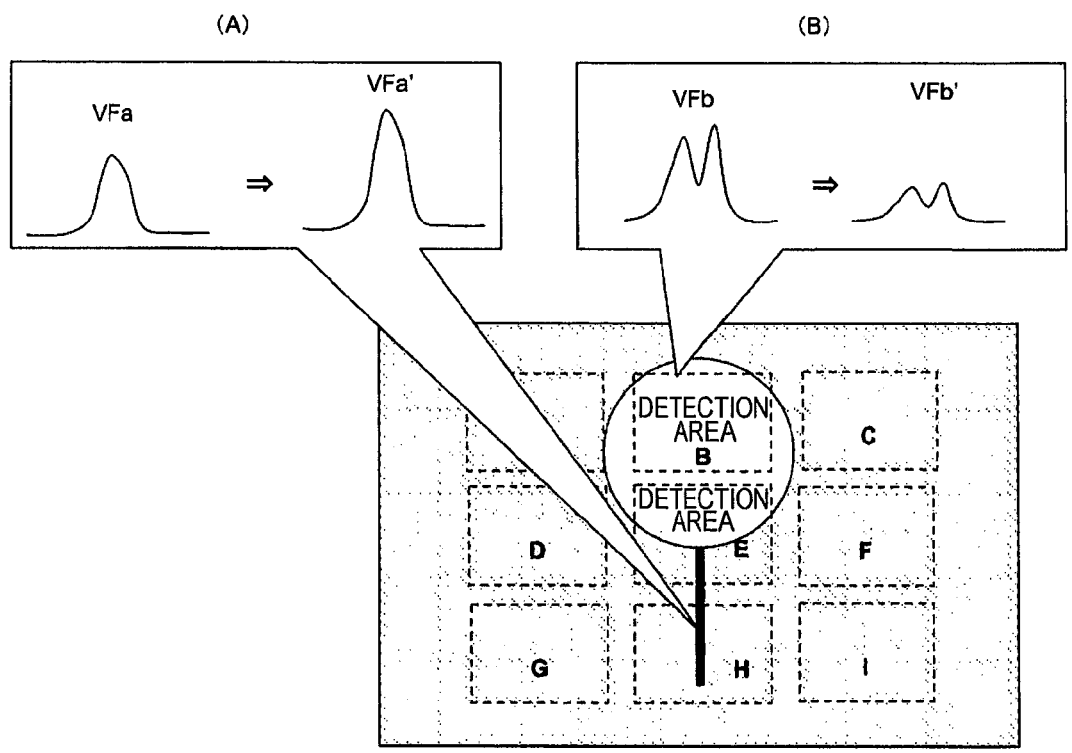
FIG. 6 shows image and detection areas used to determine a lens position evaluation value in an example of the invention.

FIG. 6 including section A and section B shows an image and the detection areas used to determine a lens position evaluation value VFMB in the present example. The subject in the image is, for example, the same street lamp as that in FIG. 4.

FIG. 6 shows a second contrast signal VFa' from the detection area H in the present example.

In the detection area H, where no high-luminance subject is present, the quotient Bs/Ba is a relatively large value. The first contrast signal VFa from the detection area H is multiplied by the quotient Bs/Ba, and the resultant second contrast signal VFa has a large absolute value VFa'. That is, when no high-luminance subject is present, the second contrast signal VFa' affects the lens position evaluation value VFMB by a large amount.

FIG. 6 also shows a second contrast signal VFb' from the detection area B in the present example.

In the detection area B, where a high-luminance subject is present, the quotient Bs/Ba is a relatively small value. The first contrast signal VFb from the detection area B is multiplied by the quotient Bs/Bb, and the resultant second contrast signal VFb has a small absolute value VFb'. That is, when a high-luminance subject is present, the contrast signal VFb' affects the lens position evaluation value VFMB by a small amount.

Similarly, contrast signals VFc' to VFi' from the detection areas A, C to G, and I are determined, and the controller 19 sums the contrast signals to determine the lens position evaluation values VFMB.

The luminance intensity Bs, which is the sum of luminance intensities, is not necessarily determined by using all the plurality of divided areas but may be determined by summing the luminance intensities in an arbitrary number of the plurality of areas. It is, however, desirable that the arbitrary number of areas include an area where a high-luminance subject is present. After the luminance intensities from arbitrary areas are summed up to the luminance intensity Bs, the quotients (Bs/Ba to Bs/Bi) in the arbitrary areas are determined. The focus control is then performed based on the contrast signals from the arbitrary areas multiplied by the quotients. In this process, the lens position evaluation value VFMB may instead be determined by summing the multiplied values in the arbitrary areas, and the focus control may be performed based on the thus determined evaluation value.

Further, the above description has been made of the case where the second contrast signals VFa to VFi are determined by multiplying the first contrast signals VFa to VFi by the quotients (Bs/Ba to Bs/Bi) and the lens position evaluation value VFMB is then calculated. The configuration described above is presented by way of example. The present example is characterized in that the first contrast signal from each of the divided areas is increased or decreased and hence weighted based on the magnitude of the luminance intensity in the area. That is, the present example employs the configuration in which the magnitude of the first contrast signal from each of the divided areas is increased or decreased based on the reciprocal of the luminance intensity in the area. According to the present configuration, even when a high-luminance subject is present, a provided contrast signal is affected by the first contrast signal from a detection area containing the point light source by a small amount but affected by the first contrast signal from a detection area containing no point light source by an enhanced amount, whereby the contrast signal peaks when the focus lens group 5 reaches an in-focus position.

As another method for lowering the effect of a point light source present in an area, it is conceivable to achieve a focused state based on the contrast signals from the areas excluding an area containing the point light source. When this method is employed in a situation in which a point light source is present as a subject in darkness, however, focusing is performed based on contrast signals produced in the darkness. In this case, it is conceivable that no focused state is achieved. In contrast, the present embodiment of the invention employs the configuration in which an area containing a point light source is not removed but the effect of the contrast signal from the area containing a point light source is lowered, whereby the situation described above in which no focused state is achieved can be avoided.

FIG. 7 shows an example of the lens position evaluation value VFMB in the present example.

The lens position evaluation value VFMB provided in the example shown in FIG. 7 avoids a situation in which the present example is not used and hence the contrast signal VFs peaks at a plurality of locations, for example, as shown in FIG. 5 and allows the contrast signal to peak when the focusing lens group 5 reaches an in-focus position.

The quotients (Bs/Ba to Bs/Bi), which are results of the division described above, can be multiplied by bias values C associated with the detection areas A to I in the controller 19. It is noted that multiplying the quotients by the bias values C is not essential, and the bias values C allow a focused state to be more readily achieved on an imaging apparatus basis or an imaging system basis in consideration of a subject, operating conditions, and other factors. For example, multiplying the quotients by the bias values C in such a way that the difference between a bright portion and a dark portion is enhanced to change the shape of the contrast signal may allow the focusing lens group 5 to stop in an in-focus position more precisely or under a variety of subject conditions.

FIG. 8 shows a table illustrating the relationship between the luminance intensities and the bias values.

The bias values C are so acquired in advance, for example, by calculation or measurement for respective luminance intensities acquired in an imaging apparatus or an imaging system that a focused state is more readily achieved in consideration of a subject, operating conditions, and other factors, and the acquired bias values C are held in a luminance/bias value relationship table. It is, however, noted that the bias values C can be set as follows: Part of the magnitude of the contrast signal that increases when the focusing lens group 5 is so moved under the autofocus control that the focusing lens group 5 stops in an in-focus position, specifically, an increase in the magnitude that results from a detection area containing a point light source and is hence disadvantageous to the focusing operation is lowered by at least a fixed amount. It is further noted that the luminance/bias value relationship table is stored in advance in the internal memory 20 in the controller 19.

The controller 19, when it moves the focusing lens group 5 to an in-focus position under the autofocus control, selects a bias value specified in the luminance/bias value relationship table in accordance with each luminance intensity obtained during the movement. The controller 19 then monitors the lens position evaluation value VFMB and controls the motor driver circuit 25 at the timing when the lens position evaluation value VFMB peaks to stop the movement of the focusing lens group 5.

Figure 9:
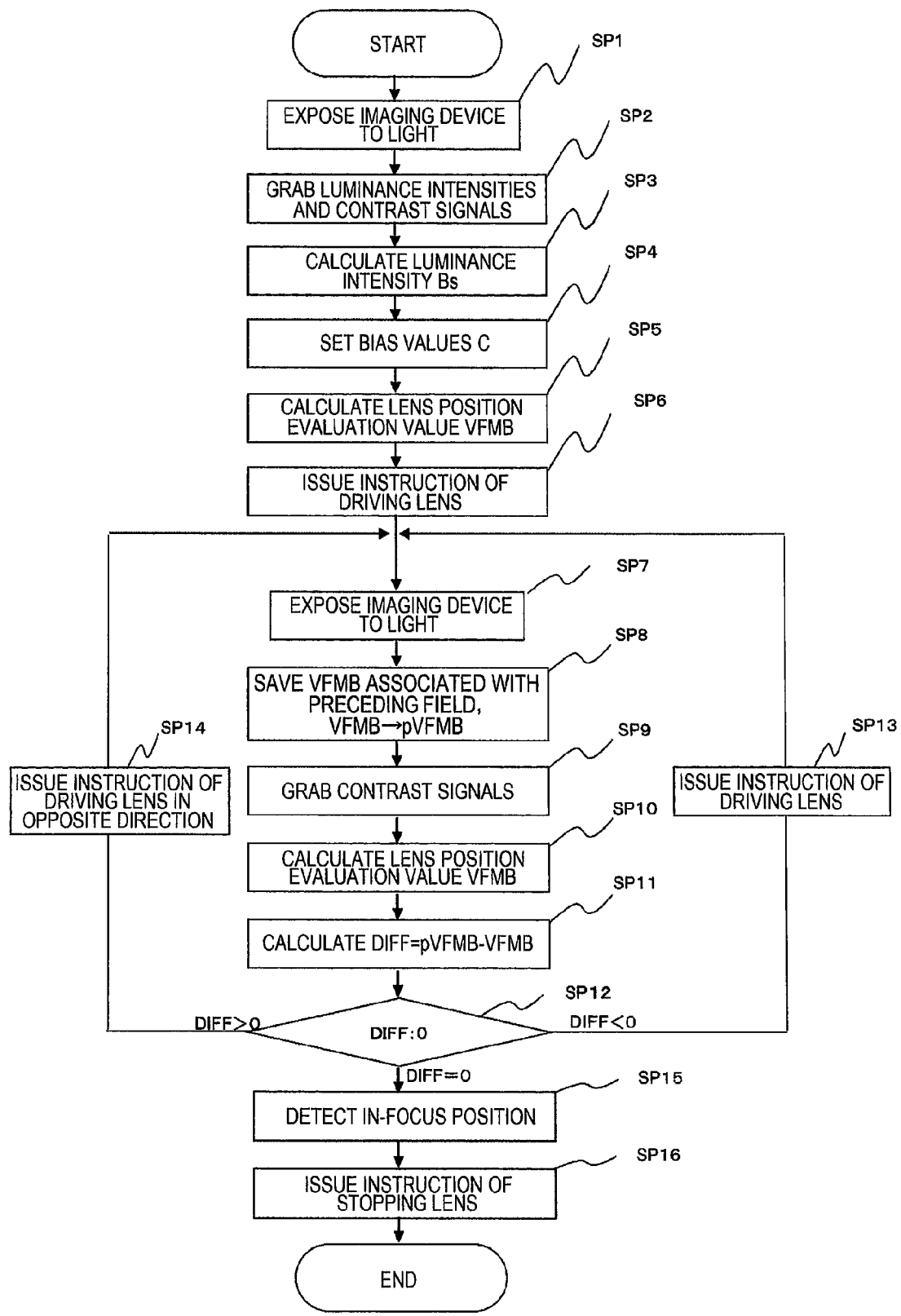
FIG. 9 shows a specific autofocus control process related to autofocus control in the present example.

FIG. 9 shows a specific autofocus control process related to the autofocus control in the present example.

The controller 19 carries out the autofocus control process shown in FIG. 9 based on the above-mentioned autofocus data processing program 22 stored in the internal memory 20.

The controller 19 starts the autofocus control process when the imaging apparatus 1 is powered on.

First, an electronic shutter 29 is driven to expose the imaging device to light for acquisition of a captured image signal corresponding to one field (SP1).

The first contrast signals VFa to VFi provided from the camera signal processor 12 are then grabbed by the contrast signal generator 15 (SP2).

The controller 19 subsequently performs the following operation based on the first contrast signals VFa to VFi grabbed in step SP2 and the extracted luminance intensities Ba to Bi to calculate the luminance intensity Bs (SP3):

$$Ba+Bb+ \ldots +Bh+Bi=Bs \quad (1)$$

The controller 19 then reads bias values C from the internal memory 20 in accordance with Ba to Bi, sets the read bias values C as Ca to Ci (SP4), and performs the following operation to calculate the lens position evaluation value VFMB (SP5):

$$(VFa \times Bs/Ba \times Ca)+(VFb \times Bs/Bb \times Cb)+ \ldots +(VFh \times Bs/Bh \times Ch)+(VFi \times Bs/Bi \times Ci)=VFMB \quad (2)$$

In Expression (2), the lens position evaluation value VFMB is a value multiplied by the bias values C, but the multiplication of the bias values C described above is not essential, and a lens position evaluation value multiplied by no bias value C can also be calculated.

The controller 19 then sends the resultant autofocus evaluation value to the motor driver circuit 25 to drive the motor 28, which then moves the focusing lens group 5 along the optical axis thereof (SP6).

After the electronic shutter 29 is driven in step SP1, and a period corresponding to one field (1/60 sec) elapses or the time at which the following captured image signal is grabbed is reached, the controller 19 drives the electronic shutter 29 again to expose the imaging device 8 to light (SP7). On the other hand, the lens position evaluation value VFMB acquired in step SP5 and associated with the preceding field is temporarily saved as a one-field-preceding lens position evaluation value pVFMB in the internal memory 20 (SP8).

The controller 19 then grabs the first contrast signals VFa to VFi provided from the camera signal processor 12 (SP9) and performs the operation expressed by Expression (2) based on the signal levels of the grabbed contrast signals VFa to VFi to calculate the lens position evaluation value VFMB in the field (SP10).

The controller 19 then reads the one-field-preceding lens position evaluation value pVFMB temporarily saved in the internal memory 20 and performs the following operation to calculate a difference DIFF between the one-field-preceding lens position evaluation value pVFMB and the current lens position evaluation value VFMB (SP11):

$$DIFF=pVFMB-VFMB \quad (3)$$

The controller 19 then evaluates whether the difference DIFF calculated in step SP8 is equal to, smaller than, or greater than "0" (SP12).

In the evaluation, a result of DIFF<0 means that the lens position evaluation value VFMB has not peaked. At this point, the controller 19 generates a motor control signal based, for example, on the lens position evaluation value VFMB and sends the motor control signal to the motor driver circuit 25 so that it controls the motor 28 to continue to move the focusing lens group 5 in the same direction as the direction instructed in step SP6 (SP13).

On the other hand, a result of DIFF>0 in the evaluation means that the lens position evaluation value VFMB has peaked and passed the peak. At this point, the controller 19 generates a motor control signal based, for example, on the provided lens position evaluation value VFMB and sends the motor control signal to the motor driver circuit 25 so that it controls the motor 28 to move the focusing lens group 5 in the direction opposite to the direction instructed in step SP6 (SP14).

The controller 19 then returns to step SP7 and repeats the same processes (SP7 to SP12).

On the other hand, DIFF=0 in the evaluation in step SP12 means that the lens position evaluation value VFMB has just peaked. The evaluation of whether or not the lens is in an in-focus position is not necessarily made only when DIFF=0, and when evaluation of whether the absolute value of DIFF falls within a predetermined range shows that the absolute value falls within the predetermined range, it is evaluated that the focusing lens group 5 is in the in-focus position. At this point, the controller 19 evaluates that the focusing lens group 5 is in the in-focus position (SP15) and terminates the autofocus control process (SP16).

As described above, the imaging apparatus 1 according to the present embodiment monitors the lens position evaluation value VFMB under the focus control and stops the movement of the focusing lens group 5 at the timing when the lens position evaluation value VFMB peaks. Further, setting the bias values C allows the focusing lens group 5 to be stopped in an in-focus position more precisely or under a variety of subject conditions in such a way that the lens position evaluation value VFMB peaks when the focusing lens group 5 in the lens unit 2 reaches the in-focus position.

Therefore, according to the imaging apparatus 1 in the present embodiment, even in the case where the contrast peaks in a position different from an in-focus position due to a point light source or any other similar object as a subject in related art, the autofocus control using the lens position evaluation value VFMB calculated based on the quotients (Bs/Ba to Bs/Bi) is performed, whereby the focusing lens group 5 can be precisely stopped in the in-focus position. The focusing precision under the focus control can therefore be improved.

In the control in the present embodiment, the procedure up to the calculation of Ba to Bi and Bs is not necessarily performed only when the autofocus control is initiated and may also be performed when the autofocus control is being performed, that is, after an instruction of driving the focusing lens group 5 is issued. That is, when the contrast signals are grabbed (SP9) after step SP13 or SP14, luminance intensities may also be extracted in the same manner as in step SP2 and Ba to Bi and Bs may be updated. Further, the bias values C may be set at this point, and the lens position evaluation value VFMB may then be calculated.

(3) Other Embodiments

In the above embodiment, the description has been made of the case where the invention is applied to the imaging apparatus configured as shown in FIG. 1, but the invention is not necessarily applied thereto and is widely applicable to imaging apparatus having a variety of other configurations.

In the above embodiment, the description has been made of the case where the bias values C are set by calculation or measurement, but the invention is not necessarily configured this way. The bias values C may instead be so set that after the imaging device 8 acquires captured video images, from which luminance intensities are obtained, the contrast signals VFa to VFi may be corrected based on the overall luminance intensities, and the autofocus control using the resultant lens position evaluation value VFMB allows the focusing lens group 5 to be stopped in an in-focus position.

Further, in the above embodiment, the first contrast signals VFa to VFi are acquired from the nine divided detection areas, each of which has a rectangular shape as shown in FIG. 2, but the invention is not necessarily configured this way. Each of the detection areas does not necessarily have a rectangular shape and may have an arbitrary shape, and the number of detection areas may be at least one.

What is claimed is:

1. An imaging apparatus that performs focus control, the imaging apparatus comprising:
    a contrast signal generator that divides a captured image screen into a plurality of areas, extracts a frequency component based on a video signal for each of the divided areas, and generates a first contrast signal based on the frequency component; and
    a controller that extracts a luminance intensity based on the video signal for each of the divided areas, determines the sum of the luminance intensities in an arbitrary number of the plurality of the divided areas, determines, for each of the divided areas of the arbitrary number of the plurality of divided areas, a quotient of the sum divided by the luminance intensity in a divided area of the arbitrary number of the plurality of divided areas, determines, for each of the arbitrary number of the plurality of divided areas, a second contrast signal generated by multiplying the first contrast signal in the divided area by the quotient, determines a lens position evaluation value that is the sum of the second contrast signals, and performs the focus control based on the lens position evaluation value.

2. The imaging apparatus according to claim 1, wherein the divided areas include an area where a high-luminance subject is present.

3. The imaging apparatus according to claim 2, wherein the arbitrary number of the plurality of the divided areas is all of the divided areas.

4. The imaging apparatus according to claim 1, wherein the arbitrary number of the plurality of the divided areas is all of the divided areas.

5. The imaging apparatus according to claim 1, wherein the controller sets a bias value for each of the quotients based on the corresponding luminance intensity and sets the bias value.

6. An imaging method for performing focus control, the method comprising:
    dividing a captured image screen into a plurality of areas, extracting a frequency component based on a video signal for each of the divided areas, and generating a first contrast signal based on the frequency component; and
    extracting a luminance intensity based on the video signal for each of the divided areas, determining, for an arbitrary number of the plurality of the divided areas, a second contrast signal generated by increasing or decreasing the magnitude of the first contrast signal from the divided area based on the magnitude of the luminance intensity, determining a lens position evaluation value that is the sum of the second contrast signals from the divided areas, and performing the focus control based on the lens position evaluation value.

7. The imaging apparatus according to claim 6, wherein the arbitrary number of the plurality of the divided areas is all of the divided areas.

8. A focus control apparatus that performs focus control, the focus control apparatus comprising:
    a contrast signal generator that divides a captured image screen into a plurality of areas, extracts a frequency component based on a video signal for each of the divided areas, and generates a first contrast signal based on the frequency component; and
    a controller that extracts a luminance intensity based on the video signal for each of the divided areas, determines, for an arbitrary number of the plurality of the divided areas, a second contrast signal generated by increasing or decreasing the magnitude of the first contrast signal from the divided area based on the magnitude of the luminance intensity, determines a lens position evaluation value that is the sum of the second contrast signals, and performs the focus control based on the lens position evaluation value.

9. The imaging apparatus according to claim 8, wherein the arbitrary number of the plurality of the divided areas is all of the divided areas.

* * * * *